(12) United States Patent
Wada et al.

(10) Patent No.: US 7,817,524 B2
(45) Date of Patent: Oct. 19, 2010

(54) OPTICAL HEAD DEVICE WITH MULTIPLE DIFFRACTING PLANES, AND AN OPTICAL INFORMATION APPARATUS, COMPUTER, VIDEO RECORDING/REPRODUCING APPARATUS, VIDEO REPRODUCING APPARATUS, SERVER, AND CAR NAVIGATION SYSTEM INCLUDING THE SAME

(75) Inventors: Hidenori Wada, Kyoto (JP); Keiichi Matsuzaki, Osaka (JP); Yukihiro Chokyu, Ehime (JP); Hideki Aikoh, Osaka (JP)

(73) Assignee: Panasonic Corporation, Osaka (JP)

( * ) Notice: Subject to any disclaimer, the term of this patent is extended or adjusted under 35 U.S.C. 154(b) by 492 days.

(21) Appl. No.: 11/867,024

(22) Filed: Oct. 4, 2007

(65) Prior Publication Data
US 2008/0084810 A1    Apr. 10, 2008

(30) Foreign Application Priority Data
Oct. 6, 2006   (JP) ............................... 2006-274913

(51) Int. Cl.
*G11B 7/135*   (2006.01)

(52) U.S. Cl. ................................. 369/112.07

(58) Field of Classification Search ........................ None
See application file for complete search history.

(56) References Cited

U.S. PATENT DOCUMENTS

| | | | |
|---|---|---|---|
| 6,094,308 A * | 7/2000 | Katsuma | 359/569 |
| 7,110,180 B2 * | 9/2006 | Kawasaki et al. | 359/569 |
| 7,463,568 B2 * | 12/2008 | Mimori et al. | 369/112.07 |
| 7,502,301 B2 * | 3/2009 | Nagashima | 369/112.11 |
| 2002/0018433 A1 * | 2/2002 | Ohuchida | 369/112.07 |
| 2002/0097660 A1 * | 7/2002 | Komma et al. | 369/112.04 |
| 2003/0007436 A1 * | 1/2003 | Komma et al. | 369/53.2 |
| 2004/0081064 A1 | 4/2004 | Ohnishi et al. | |
| 2004/0094699 A1 * | 5/2004 | Goto et al. | 250/237 G |
| 2004/0233533 A1 * | 11/2004 | Tanaka et al. | 359/566 |
| 2005/0237900 A1 * | 10/2005 | Sano et al. | 369/112.08 |
| 2006/0239171 A1 * | 10/2006 | Ooi et al. | 369/112.16 |
| 2007/0030788 A1 * | 2/2007 | Nakamori et al. | 369/112.06 |

FOREIGN PATENT DOCUMENTS

JP   2004-145915   5/2004

* cited by examiner

*Primary Examiner*—Peter Vincent Agustin
(74) *Attorney, Agent, or Firm*—Renner, Otto, Boisselle & Sklar, LLP

(57) ABSTRACT

An optical head device 100 of the invention performs at least one of recording and reproducing of information for a plurality of types of optical recording mediums 7. A light source 1 emits a plurality of kinds of light having mutually different wavelengths. The positions for emitting the plurality of kinds of light from the light source are mutually deviated. A center C1 of first light 2a is matched with a pattern center C3 of a first diffracting plane 3a. A center C2 of second light 2b is matched with a pattern center C4 of a second diffracting plane 3b. The optical head apparatus 100 provided with the light source in which two or more light emitting elements are mounted in one module can perform stable tracking control.

17 Claims, 9 Drawing Sheets

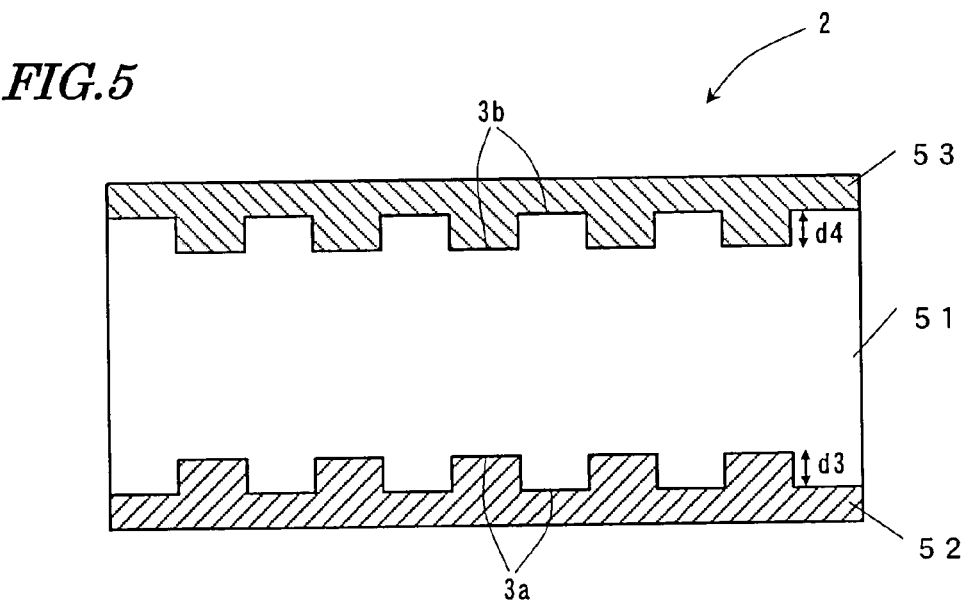
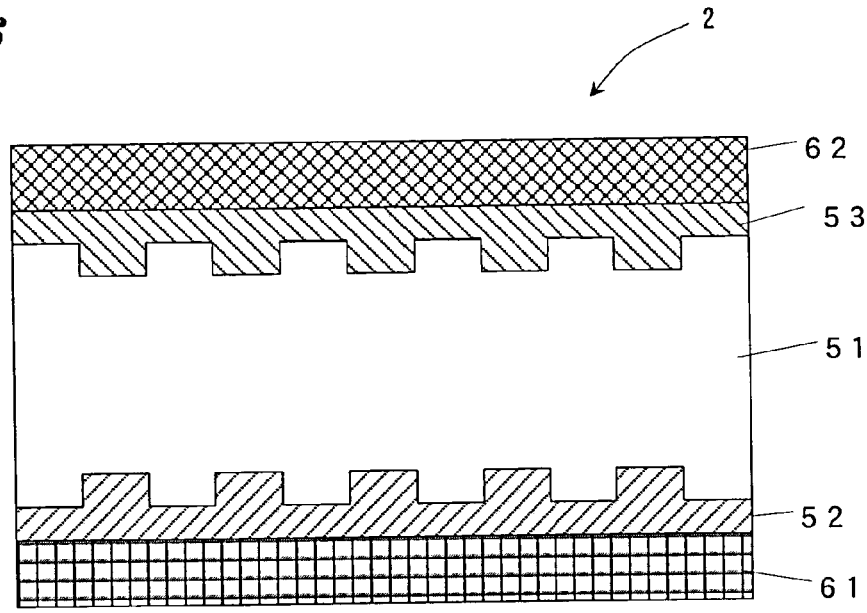

OPTICAL HEAD DEVICE WITH MULTIPLE DIFFRACTING PLANES, AND AN OPTICAL INFORMATION APPARATUS, COMPUTER, VIDEO RECORDING/REPRODUCING APPARATUS, VIDEO REPRODUCING APPARATUS, SERVER, AND CAR NAVIGATION SYSTEM INCLUDING THE SAME

BACKGROUND OF THE INVENTION

1. Field of the Invention

The present invention relates to an optical head device, and an optical information apparatus, a computer, a video recording/reproducing apparatus, a video reproducing apparatus, a server, and a car navigation system provided with such an optical head device.

2. Description of the Related Art

Recently, DVD (Digital Versatile Disc) attracts attention as a large-capacity optical recording medium because the DVD can record digital information at a recording density about 6 times as large as that of CD (Compact Disc). As for DVD, there are various standards such as a recordable type and a rewritable type, for example, DVD-RAM, DVD-R, DVD-RW and the like. In DVD-RAM, there are two types, i.e., a type having a track pitch of 1.48 μm and a recording capacity of 2.6 GB, and a type having a track pitch of 1.23 μm and a recording capacity of 4.7 GB. The track pitch of DVD-R and DVD-RW is 0.74 μm. As described above, the track pitches are different depending on the types of DVD.

When the recording and reproduction for a plurality of types of disks with different track pitches are performed by a single optical head device, it is impossible to obtain a tracking error signal in good conditions by a general 3-beam tracking system because of the difference in track pitches. In view of this problem, Patent Document 1 (Japanese Laid-Open Patent Publication No. 2004-145915) proposes an optical head device by which a tracking error signal can be obtained in good conditions from all types of disks having mutually different track pitches.

With reference to the drawings, the optical head device by which a tracking error signal can be obtained in good conditions from any of types of disks having mutually different track pitches will be described.

FIG. 14 is a diagram showing an optical head device 140. The optical head device 140 includes a light source 141, a diffraction grating 142, a half mirror 143, a collimator lens 144, an objective lens 145, a detection lens 147, and a photo detector 148.

The light source 141 includes a semiconductor laser device, and emits coherent light with which a recording layer of an optical recording medium 146 is irradiated in recording/reproducing. The diffraction grating 142 is an optical element for diffracting and separating the light emitted from the light source 141 into at least three light beams. A tracking error signal can be obtained by using the diffracted light beams generated by the optical element. The diffraction grating 142 will be described later in detail.

A multi-layer film is formed in the half mirror 143. The half mirror 143 reflects 50% of the incident light, and transmits 50% thereof. The collimator lens 144 converts divergent light emitted from the light source 141 into parallel light. The objective lens 145 focuses the light onto a recording layer of the optical recording medium 146. An outgoing face of the detection lens 147 is a cylindrical face. For performing detection of a focus error signal by astigmatism, the detection lens 147 applies astigmatism to the incident light. The photo detector 148 receives light reflected from the recording layer of the optical recording medium 146 and converts the light into an electric signal.

Next, the operation of the optical head device 140 will be described in more detail. The light emitted from the light source 141 is diffracted into at least three light beams by the diffraction grating 142. The diffracted light beams are reflected in the direction toward the optical recording medium 146 by the half mirror 143, and converted into parallel light by the collimator lens 144. The parallel light is focused on a recording plane of the optical recording medium 146 by the objective lens 145. The three light beams formed by the diffraction grating 142 are independently focused on the recording plane of the optical recording medium 146, thereby forming three focused light spots. FIG. 15 shows the three focused light spots 149a, 149b, and 149c. Guide grooves 151 are formed at regular intervals on the optical recording medium 146. The focused light spots 149a, 149b, and 149c are formed in a substantially straight line so as to be simultaneously incident on one and the same guide groove 151.

The light reflected from the recording plane of the optical recording medium 146 is transmitted through the objective lens 145, the collimator lens 144, and the half mirror 143. The transmitted light is also transmitted through the detection lens 147 for applying astigmatism to the light. Then, the transmitted light is incident on the photo detector 148. The photo detector 148 performs photoelectric transfer in accordance with the incident light, thereby producing electric signals for obtaining information signals and servo signals (a focus error signal for focus control, and a tracking error signal for tracking control).

The electric signals produced by respective light receiving planes 148a, 148b, and 148c of the photo detector 148 shown in FIG. 15 are input into arithmetic circuits (subtracters 152a, 152b, and 152c, an accumulator 153, an amplifier 154, and a subtracter 155), thereby obtaining a tracking error signal.

The photo detector 148 has two-divided light receiving planes which are divided in a direction corresponding to a direction orthogonal to a radial direction of a disk (that is, a tangential direction of the disk). Based on a difference between signals output from the respective divided light receiving faces, push-pull signals corresponding to the respective focused light spots are detected. Generally, a push-pull signal is detected based on a difference between output signals from two-divided light receiving planes which are divided in a direction corresponding to a radial direction of a disk. However, herein, the astigmatism is adopted for detecting a focus error signal, so that the intensity distribution of the light spot on the light receiving plane is rotated by about 90 degrees around the optical axis. Accordingly, the push-pull signal is detected based on a difference between the output signals from the two-divided light receiving faces divided in the direction corresponding to the tangential direction of the disk.

Next, the diffraction grating 142 will be described in more detail. FIG. 16 is a perspective view showing a lattice pattern of the diffraction grating 142. In a lattice plane of the diffraction grating 142, lattice grooves are formed at regular intervals. The lattice plane is divided into at least three regions by dividing lines orthogonal to the direction in which the grooves are extended. In other words, the lattice plane is divided into at least three regions in a direction corresponding to the tracking direction of the optical recording medium 146. In an example shown in FIG. 16, the lattice plane is divided into three regions 161, 162, and 163 by dividing lines L1 and L2. The center region 162 has a predetermined width W.

With respect to the phase of the lattice grooves in the center region 162, the phase of the lattice grooves in the region 161 adjacent to the region 162 is shifted by +90 degrees. That is, the arrangement of the lattice grooves in the region 161 is shifted by about ¼ of the lattice groove interval with respect to the lattice grooves in the center region 162. On the other hand, the phase of the lattice grooves in the region 163 which is adjacent on the opposite side is shifted by −90 degrees with respect to the lattice grooves in the center region 162. That is, the arrangement of the lattice grooves in the region 163 is shifted by about ½ of the lattice groove interval on the side opposite to the lattice grooves in the region 161. Accordingly, the phase of the lattice grooves in the region 161 and the phase of the lattice grooves in the region 163 are mutually shifted by 180 degrees (i.e. ½ of the lattice groove interval).

The light transmitted through the diffraction grating 142 having the above-described lattice pattern is focused by the objective lens 145, so as to form the light spots 149a, 149b, and 149c on the recording plane of the optical recording medium 146 (see FIG. 15). With respect to the push-pull signal obtained from the light spot 149a corresponding to zero-order diffracted light formed by the diffraction grating 142, the phases of the push-pull signals obtained from the light spots 149b and 149c corresponding to ±1st-order diffracted light formed by the diffraction grating 142 are inverted. All of the light spots are formed on one track, so that there is no problem even if the track pitches are different depending on the types of optical recording mediums. The deterioration degree of the tracking error signal for the lens shift is determined depending on the width W of the center region. As the width W increases, the deterioration degree decreases. However, as the width W increases, the tracking error signal when the lens shift is zero is reduced.

In the optical head device 140, the three light spots are formed on one track, so that the quality of the tracking error signal does not depend on the track pitch. Accordingly, stable tracking error signals can be obtained from various optical recording mediums having mutually different tracking pitches, so that stable reproduction and recording can be performed for the respective optical recording mediums.

However, when a dual-wavelength light source in which two light emitting elements for emitting light with mutually different wavelengths are mounted in one module is used as the light source 141 (the two light emitting elements are disposed along a radial direction), the two light emitting elements are attached in separate positions, so that the centers of light spots of the light emitted from the two light emitting elements formed by the diffraction grating 142 are mutually deviated. For this reason, when the center of the light spot corresponding to one light emitting element is matched with the center of the center region 162, the center of the light spot corresponding to the other light emitting element is deviated from the center of the center region 162. This disadvantageously looks like a condition where the lens shift occurs from the beginning. Accordingly, when the light of which the center of the light spot is matched with the center of the center region 162 is used, stable tracking control can be performed, but when the light of which the center of the light spot is not matched is used, stable tracking control cannot be performed, thereby deteriorating the recording/reproducing properties.

SUMMARY OF THE INVENTION

The present invention provides an optical head device which can perform stable tracking control even when a plurality of kinds of light beams with mutually different wavelengths are used, thereby performing stable recording and/or reproducing operations. In addition, the present invention provides an optical information apparatus, a computer, a video recording/reproducing apparatus, a video reproducing apparatus, a server, and a car navigation system on which such an optical head device is mounted.

The optical head device of the invention is an optical head device for performing at least one of recording and reproducing of information for a plurality of types of optical recording mediums, including: a light source for emitting light; an objective lens for focusing the light onto the optical recording medium; and a diffraction element disposed between the light source and the objective lens, the diffraction element having a plurality of diffracting planes, wherein the light source emits a plurality of kinds of light having mutually different wavelengths, positions for emitting the plurality of kinds of light from the light source are mutually deviated, the plurality of kinds of light includes first light and second light, the plurality of diffracting planes includes first and second diffracting planes, a distance between a center of the first light and a pattern center of the first diffracting plane is shorter than a distance between a center of the second light and the pattern center of the first diffracting plane, and a distance between the center of the second light and a pattern center of the second diffracting plane is shorter than a distance between the center of the first light and the pattern center of the second diffracting plane.

In one embodiment, a ratio of diffraction for diffracting the first light by the first diffracting plane is higher than a ratio of diffraction for diffracting the first light by the second diffracting plane, and a ratio of diffraction for diffracting the second light by the second diffracting plane is higher than a ratio of diffraction for diffracting the second light by the first diffracting plane.

In one embodiment, the pattern center f the first diffracting plane and the pattern center of the second diffracting plane are mutually deviated.

In one embodiment, a material of at least part of the diffraction element is glass, the first diffracting plane includes a first concave and convex portion on a first surface of the glass, the second diffracting plane includes a second concave and convex portion on a second surface opposite to the first surface of the glass, and depths of concaves with respect to convexes in the first concave and convex portion and in the second concave and convex portion are mutually different.

In one embodiment, the diffraction element further includes: a first resin layer with which the first concave and convex portion is filled; and a second resin layer with which the second concave and convex portion is filled.

In one embodiment, glass is disposed on the first and second resin layers.

In one embodiment, the number of kinds of light emitted from the light source is the same as the number of the plurality of diffracting planes.

In one embodiment, the center of the first light is matched with the pattern center of the first diffracting plane, and the center of the second light is matched with the pattern center of the second diffracting plane.

In one embodiment, the light source includes a first light emitting element for emitting the first light, and a second light emitting element for emitting the second light, and the first and second light emitting elements emit the first light and the second light in the same direction.

In one embodiment, the optical head device further includes a separating portion, disposed between the light source and the objective lens, for separating the light emitted from the light source from reflected light from the optical recording medium, wherein the diffraction element is disposed between the light source and the separating portion.

In one embodiment, the first light and the second light are one of light with wavelengths of 390 nm to 420 nm, light with wavelengths of 640 nm to 680 nm, and light with wavelengths of 760 nm to 800 nm, respectively, and the wavelengths of the first light and the second light are mutually different.

In one embodiment, the plurality of kinds of light includes third light, the plurality of diffracting planes include a third diffracting plane, a distance between the center of the first light and the pattern center of the first diffracting plane is shorter than distances between the centers of the second light and the third light and the pattern center of the first diffracting plane, a distance between the center of the second light and the pattern center of the second diffracting plane is shorter than distances between the centers of the first light and the third light and the pattern center of the second diffracting plane, and a distance between the center of the third light and a pattern center of the third diffracting plane is shorter than distances between the centers of the first light and the second light and the pattern center of the third diffracting plane.

The optical information apparatus of the invention includes: the optical head device; and a control portion for controlling the operation of the optical head device.

The computer of the invention includes the optical information apparatus.

The video recording/reproducing apparatus of the invention includes the optical information apparatus, and performs recording and reproducing of video information to and from the optical recording medium.

The video reproducing apparatus of the invention includes the optical information apparatus, and reproduces video information from the optical recording medium.

The server of the invention includes the optical information apparatus.

The car navigation system of the invention includes the optical information apparatus.

According to the invention, in the optical head device provided with the light source for emitting first light and second light from positions which are deviated from each other, a distance between a center of the first light and a pattern center of a first diffracting plane is shorter than a distance between a center of the second light and the pattern center of the first diffracting plane, and a distance between the center of the second light and a pattern center of a second diffracting plane is shorter than a distance between the center of the first light and the pattern center of the second diffracting plane. As described above, the diffracting element includes a plurality of diffracting planes corresponding to a plurality of kinds of light beams with mutually different wavelengths, so that stable tracking control can be performed even when a plurality of kinds of light beams are used, and stable recording and/or reproducing operation can be performed.

According to one embodiment, a ratio of diffraction for diffracting the first light by the first diffracting plane is higher than a ratio of diffraction for diffracting the first light by the second diffracting plane, and a ratio of diffraction for diffracting the second light by the second diffracting plane is higher than a ratio of diffraction for diffracting the second light by the first diffracting plane. In addition, in accordance with the first light and the second light emitted from the positions which are deviated from each other, the pattern center of the first diffracting plane and the pattern center of the second diffracting plane are mutually deviated. As describe above, the diffracting element includes a plurality of diffracting planes corresponding to a plurality of kinds of light beams with mutually different wavelengths, so that stable tracking control can be performed even when a plurality of kinds of light beams are used, and stable recording and/or reproducing operation can be performed.

According to one embodiment, the material of part of the diffraction element is glass. The first diffracting plane includes a first concave and convex portion formed on a first surface of the glass, and the second diffracting plane includes a second concave and convex portion formed on a second surface opposite to the first surface of the glass. The depths of concaves with respect to convexes in the first concave and convex portion and in the second concave and convex portion are mutually different. Accordingly, a diffraction element having a wavelength selection property can be realized by a simple construction, so that the diffraction element can be produced at a low cost.

Moreover, according to one embodiment, the diffraction element further includes: a first resin layer with which the first concave and convex portion is filled; and a second resin layer with which the second concave and convex portion is filled. Accordingly, the depth of the respective concave and convex portion can be decreased, so that a diffraction element with high efficiency in which higher-order diffraction is reduced can be realized.

According to one embodiment, glass is disposed on the first and the second resin layers. Accordingly, the resin layer is not in contact with the air, the reliability and the durability of the diffraction element can be improved.

According to one embodiment, the diffraction element is disposed between the light source and the separating portion. Accordingly, the diffraction element will not diffract the light reflected from the optical recording medium, so that loss of the light amount and the occurrence of stray light can be suppressed.

According to one embodiment, the light emitted from the light source is one of light with wavelengths of 390 nm to 420 nm, light with wavelengths of 640 nm to 680 nm, and light with wavelengths of 760 nm to 800 nm, respectively. Accordingly, stable tracking error signals can be obtained from different types of optical recording mediums such as a BD (Blu-ray Disc), a DVD, and a CD.

The optical information apparatus, the computer, the video recording/reproducing apparatus, the video reproducing apparatus, the server, and the car navigation system are provided with the above-described optical head device, so that stable recording and/or reproducing operation can be performed.

The foregoing summary as well as the following detailed description of the preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

BRIEF DESCRIPTION OF THE DRAWINGS

FIG. 5 is a cross-sectional view showing a diffraction element in one embodiment of the invention.

FIG. 6 is a cross-sectional view showing a diffraction element in one embodiment of the invention.

DETAILED DESCRIPTION OF THE PREFERRED EMBODIMENTS

Hereinafter, preferred embodiments of an optical head device and various apparatuses provided with the optical head device of the invention will be described with reference to the accompanying drawings.

Embodiment 1

Figure 1:
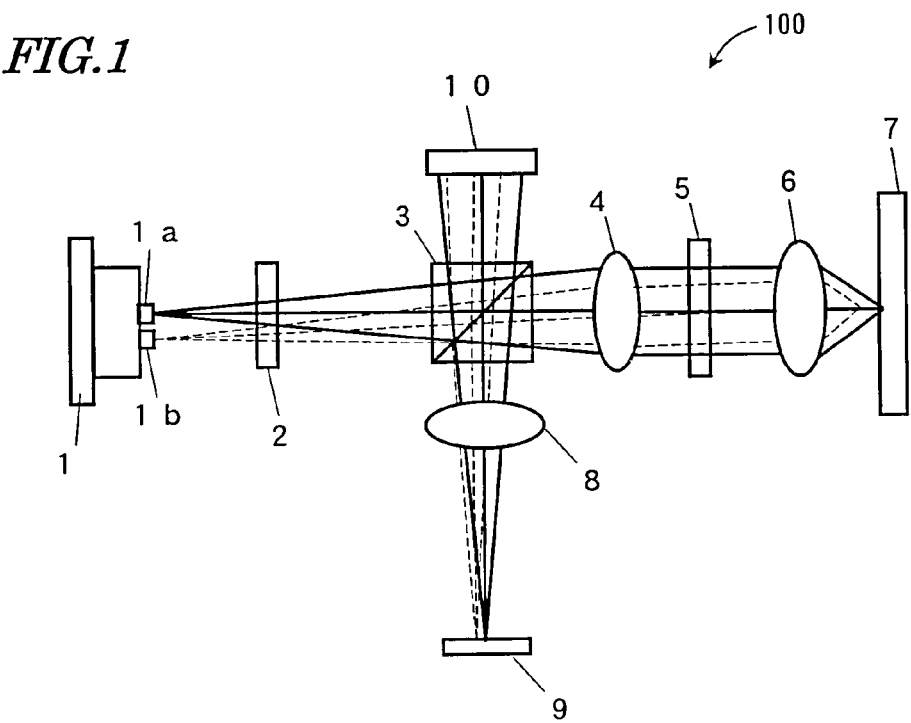
FIG. 1 is a diagram showing an optical head device in one embodiment of the invention.

FIG. 1 is a diagram showing an optical head device 100 in Embodiment 1 of the invention. The optical head device 100 performs recording and/or reproducing of information to and/or from an optical recording medium 7 by irradiating the optical recording medium 7 with laser light. The optical head device 100 includes a light source 1, a diffraction element 2, a polarizing beam splitter 3, a collimator lens 4, a quarter-wave plate 5, an objective lens 6, a detection lens 8, a photo detector 9, and a photo detector 10 for controlling the quantity of light of the light source.

The light source 1 is a dual-wavelength light source in which two light emitting elements 1a and 1b with mutually different emitting wavelengths are mounted in one module. For example, the light emitting element 1a emits one of coherent light with wavelengths of 640 nm to 680 nm and coherent light with wavelengths of 760 nm to 800 nm. The light emitting element 1b emits the other light. The light emitting elements 1a and 1b are disposed along a direction corresponding to a radial direction of the optical recording medium 7.

Figure 16:
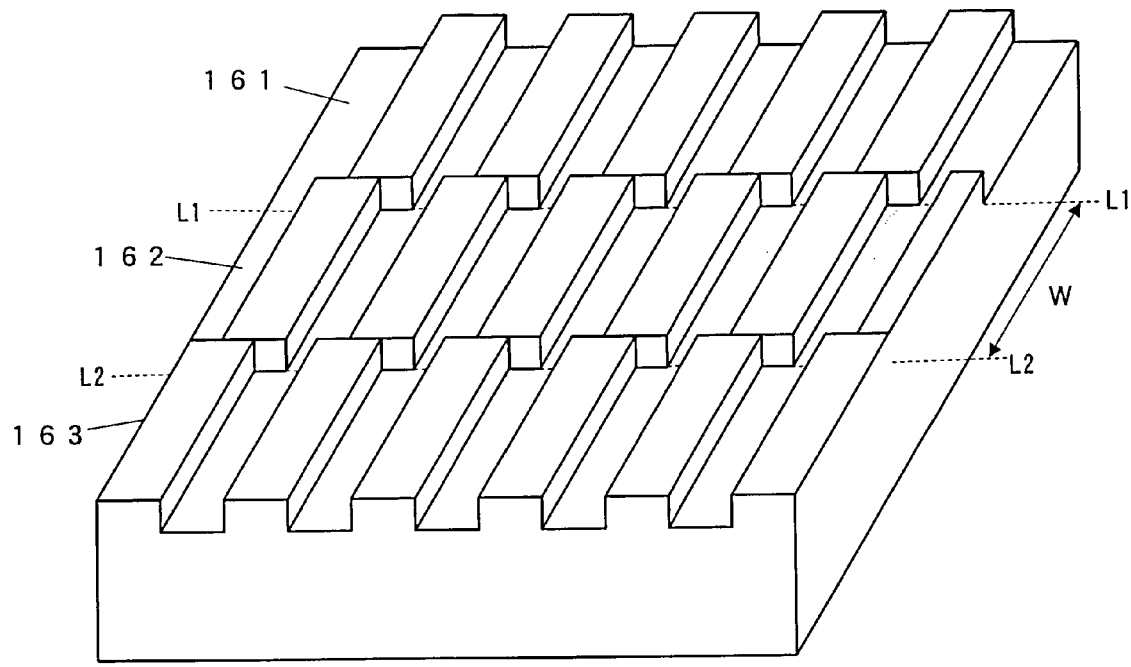
FIG. 16 is a diagram showing a pattern of the diffraction element.

The diffraction element 2 is an optical element having a wavelength selection property. The diffraction element 2 includes a plurality of diffracting planes having a lattice pattern shown in FIG. 16. The diffraction element 2 diffracts and separates the respective light emitted from the light source 1 into at least three light beams. A tracking error signal can be obtained by using the diffracted light generated by the diffraction element 2. The transmittance of the diffraction element 2 is about 80%, for example, and ±1st-order diffraction efficiency is about 8%, for example.

The polarizing beam splitter 3 is an optical element formed by multi-layer films. The polarizing beam splitter 3 functions as a separating section for separating the light into the light output from the light source 1 and the reflected light from the optical recording medium 7. The diffraction element 2 and the polarizing beam splitter 3 are disposed between the light source 1 and the objective lens 6. The diffraction element 2 is disposed between the light source 1 and the polarizing beam splitter 3.

As for the light with wavelengths of 640 nm to 680 nm, the polarizing beam splitter 3 has characteristics for transmitting 90% and reflecting 10% of certain linearly polarized light, and for reflecting 100% of linearly polarized light which is orthogonal to the polarized direction of the certain linear polarized light. As for the light with wavelengths of 760 nm to 800 nm, the polarizing beam splitter 3 has characteristics for transmitting 90% and reflecting 10% of light irrespective of the direction of linearly polarized light.

The collimator lens 4 converts divergent light of all wavelengths output from the light source 1 into parallel light. The quarter-wave plate 5 is an optical element for converts linearly polarized light into circularly polarized light. The quarter-wave plate 5 is formed from a double refraction material (e.g., quartz or resin). The objective lens 6 is a lens for focusing light onto a recording layer of the optical recording medium 7. A diffraction grating is formed on a surface of the lens, so as to have a numerical aperture (NA) of 0.65 for the light with wavelengths of 640 nm to 680 nm, and have a numerical aperture (NA) of 0.5 for the light with wavelengths of 760 nm to 800 nm.

An incident face of the detection lens 8 is a cylindrical face, and an outgoing face thereof is a rotationally symmetric face with respect to a lens optical axis. For performing detection of a focus error signal by astigmatism, astigmatism is applied to incident light. The photo detector 9 receives light reflected from the recording layer of the optical recording medium 7, and converts the light into an electric signal. The photo detector 10 for controlling the quantity of light from the light source receives the light reflected from the polarizing beam splitter 3 and converts the received light into an electric signal. Based on the electric signal, the emitting power of the light source 1 is controlled.

Next, the operation of the optical head device 100 will be described in more detail. Herein, the optical recording medium 7 is a DVD of high recording density (a DVD-RAM, a DVD-R, a DVD-RW, or the like).

Figure 15:
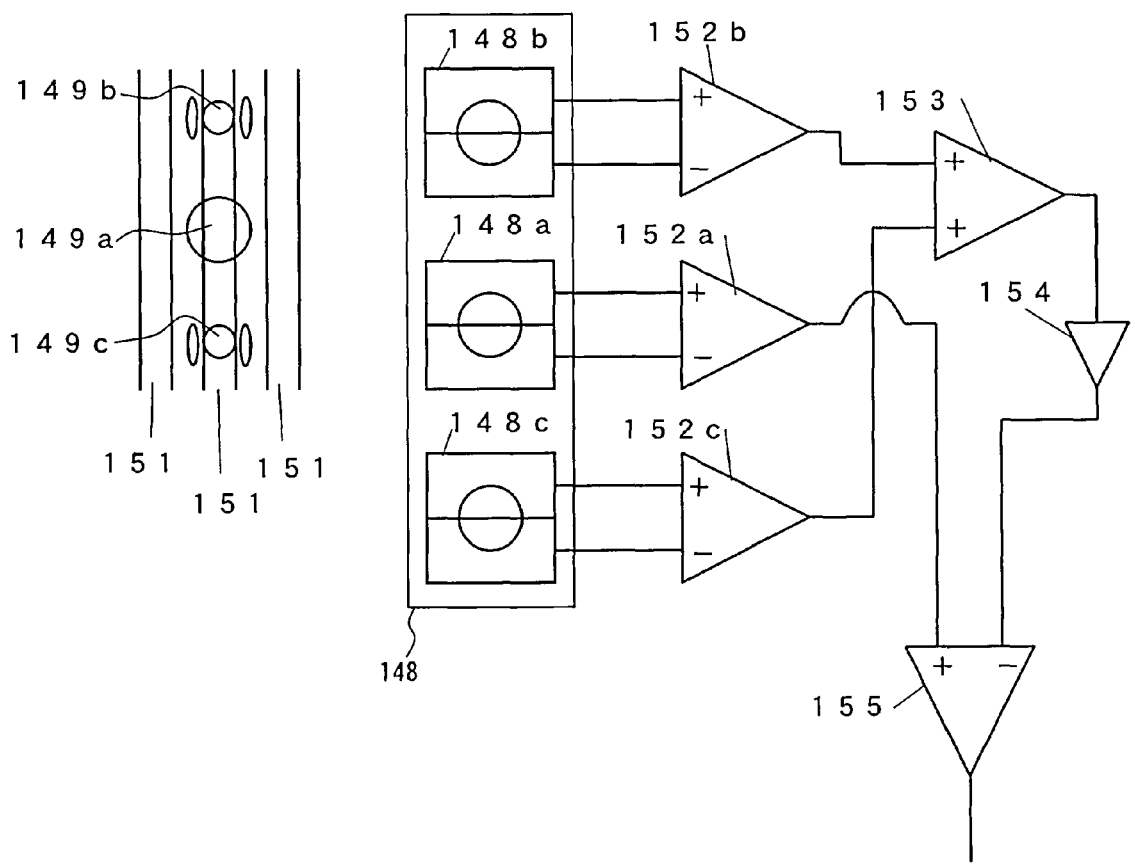
FIG. 15 is a diagram showing light spots formed on an optical recording medium and an electric circuit for producing a tracking error signal by detecting reflection from the optical recording medium.

Light emitted from the light emitting element 1a of the light source 1 (wavelengths of 640 nm to 680 nm) is diffracted into at least three light beams (a zero-order diffracted light beam, and ±1st-order diffracted light beams) by the diffraction element 2. The polarizing beam splitter 3 transmits 90% of the diffracted light and reflects 10% thereof. The light transmitted through the polarizing beam splitter 3 is converted into parallel light by the collimator lens 4. The parallel light is converted from linearly polarized light into circularly polarized light by the quarter-wave plate 5. Then, the light is focused on the recording plane of the optical recording medium 7 by the objective lens 6. The three light beams formed by the diffraction element 2 are respectively focused on the recording plane of the optical recording medium 7 independently, so as to form three focused light spots. With reference to FIG. 15, three focused light spots 149a to 149c are formed in a substantially straight line so as to be simultaneously incident on one and the same guide groove among guide grooves 151 which are formed at regular intervals on the optical recording medium 7.

The circularly polarized light reflected from the recording plane of the optical recording medium 7 is transmitted though the objective lens 6, and converted into linearly polarized light from the circularly polarized light by the quarter-wave plate 5. The converted light, i.e. the linearly polarized light is linearly polarized in a direction orthogonal to the linearly polarized light emitted from the light emitting element 1a. The linearly polarized light is transmitted through the collimator lens 4, and 100% of the linearly polarized light is reflected by the polarizing beam splitter 3. The reflected light is transmitted through the detection lens 8 for applying astigmatism. Then, the light is incident on the photo detector 9. The photo detector 9 performs photoelectric transfer in accordance with the incident light, thereby producing electric signals for obtaining information signals and servo signals (a focus error signal for focus control, and a tracking error signal for tracking control).

The 10% of the light emitted from the light emitting element 1a which is reflected by the polarizing beam splitter 3 is received by the photo detector 10. Based on an electric signal output from the photo detector 10, the emitting power of the light emitting element 1a is controlled.

Next, the operation of the optical head device 100 in the case where the optical recording medium 7 is a CD with low recording density (a read-only CD, a recordable CD-R, a rewritable CD-RW, or the like) will be described.

The light emitted from the light emitting element 1b of the light source 1 (wavelengths of 760 nm to 800 nm) is diffracted into at least three light beams (a zero-order diffracted light beam, and ±1st-order diffracted light beams) by the diffraction element 2. The polarizing beam splitter 3 transmits 90% of the diffracted light and reflects 10% thereof. The light transmitted through the polarizing beam splitter 3 is converted into parallel light by the collimator lens 4. The parallel light is converted from linearly polarized light into circularly polarized light by the quarter-wave plate 5. The circularly polarized light is focused on the recording plane of the optical recording medium 7 by the objective lens 6. The three light beams formed by the diffraction element 2 is respectively focused on the recording plane of the optical recording medium 7 independently, thereby forming three focused light spots. With reference to FIG. 15, three focused light spots 149a to 149c are formed in a substantially straight line so as to be simultaneously incident on one and the same guide groove among guide grooves 151 which are formed at regular intervals on the optical recording medium 7.

Track pitches of one and the same kind of optical recording mediums 7 are identical, but the track pitches may vary due to some production errors. The invention adopts a tracking error signal detection method in which three light beams are focused on one and the same track, so that it is possible to obtain a stable tracking error signal even if such variations are caused.

The circularly polarized light reflected from the recording plane of the optical recording medium 7 is transmitted through the objective lens 6, and converted into linearly polarized light from the circularly polarized light by the quarter-wave plate 5. The converted light, i.e. the linearly polarized light is linearly polarized in a direction orthogonal to the linearly polarized light emitted from the light emitting element 1b. The linearly polarized light is transmitted through the collimator lens 4, and 10% of the linearly polarized light is reflected by the polarizing beam splitter 3. The reflected light is transmitted through the detection lens 8 for applying astigmatism. Then, the light is incident on the photo detector 9. The photo detector 9 performs photoelectric transfer in accordance with the incident light, thereby producing electric signals for obtaining information signals and servo signals (a focus error signal for focus control and a tracking error signal for tracking control).

The 10% of the light emitted from the light emitting element 1b which is reflected by the polarizing beam splitter 3 is received by the photo detector 10. Based on an electric signal output from the photo detector 10, the emitting power of the light emitting element 1b is controlled.

Next, the reason why the characteristics of the polarizing beam splitter are made not to be dependent on the direction of the linearly polarizing light will be described. In the case where the optical recording medium causes birefringence, the polarization characteristics of the light which is reflected from the optical recording medium 7 and be incident on the polarizing beam splitter are varied depending on the quantity of birefringence. Therefore, in order to introduce light of constant quantity to the photo detector 9 irrespective of the quantity of birefringence, the characteristics of the polarizing beam splitter 3 are made not to be dependent on the polarizing direction. The countermeasure against birefringence is performed because there are many compact discs with large birefringence.

Figure 2:
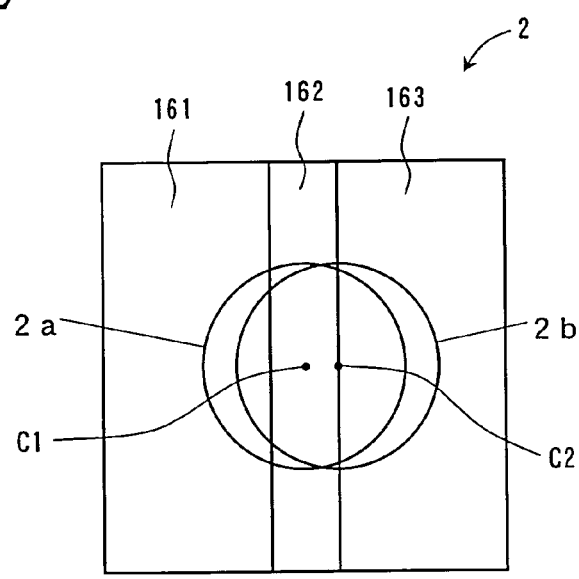
FIG. 2 is a diagram illustrating a relationship between a pattern of a diffraction element and light spots on the diffraction element.
Figure 3:
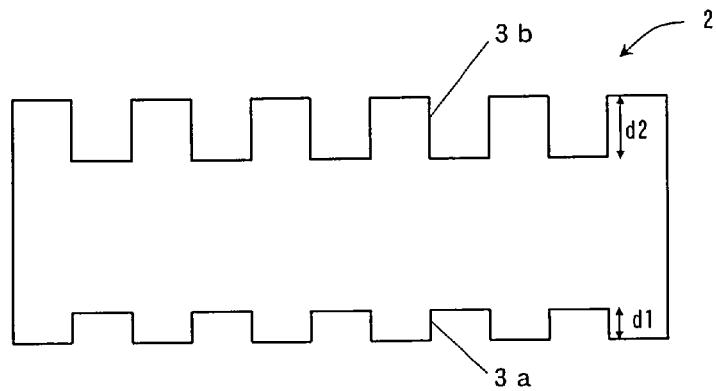
FIG. 3 is a cross-sectional view showing the diffraction element in one embodiment of the invention.
Figure 4A:
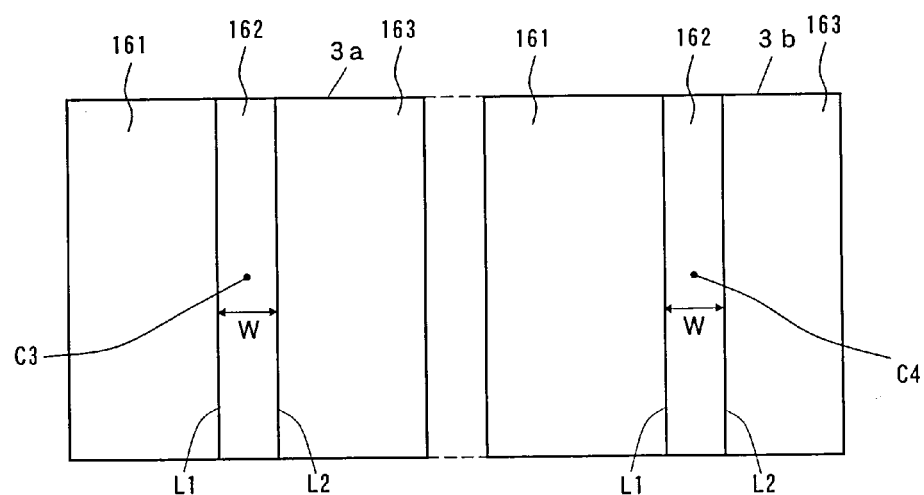
FIG. 4A is a diagram showing a pattern of the diffraction element in one embodiment of the invention.
Figure 4B:
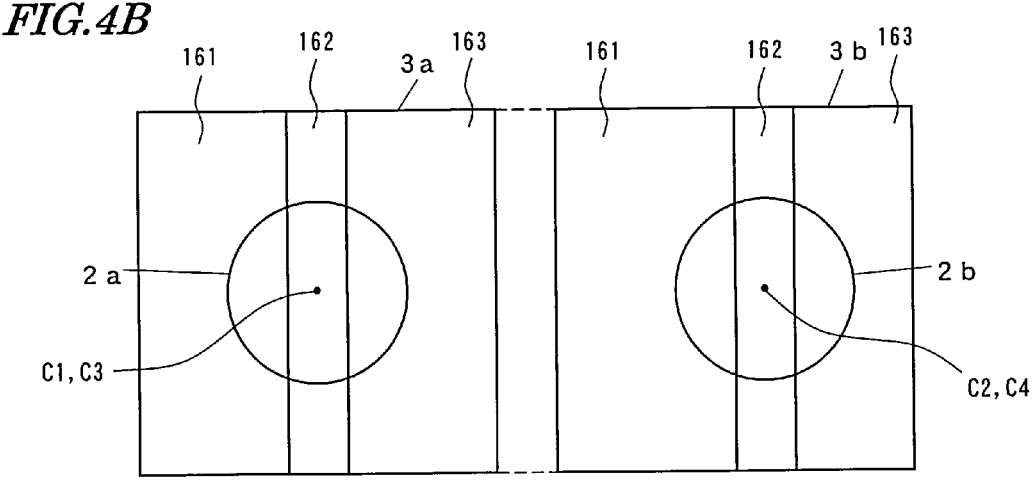
FIG. 4B is a diagram illustrating a relationship between the pattern of the diffraction element and light spots on the diffraction element in one embodiment of the invention.

Next, with reference to FIG. 2, FIG. 3, FIG. 4A, and FIG. 4B, the diffraction element 2 will be described in more detail. FIG. 2, FIG. 4A, and FIG. 4B are diagrams showing the diffraction element 2 viewed along an optical axis of the light emitted from the light source 1. FIG. 3 is a cross-sectional view of the diffraction element 2.

In the light source 1, two light emitting elements 1a and 1b are mounted so as to be mutually separated. Accordingly, light 2a emitted from the light emitting element 1a and light 2b emitted from the light emitting element 1b travel in the same direction, but the center C1 of the light 2a (see FIG. 2) and the center C2 of the light 2b are mutually deviated on the diffraction element 2. In the case where the diffraction element 2 has only one lattice pattern shown in FIG. 16, if the center of the center region 162 is matched with the center C1 of the light 2a, the center of the light 2b is deviated from the center of the center region 162. This looks like a condition where the lens shift occurs from the beginning, so that stable tracking control cannot be performed.

With reference to FIG. 3, FIG. 4A, and FIG. 4B, the diffraction element 2 in the invention includes a diffracting plane 3a corresponding to the light 2a from the light emitting element 1a, and a diffracting plane 3b corresponding to the light 2b from the light emitting element 1b. FIG. 3 is a cross-sectional view showing one of three regions 161, 162, and 163. The diffracting plane 3a contributes only to the light 2a, and the diffracting plane 3b contributes only to the light 2b.

Now, the configuration in which the diffracting planes 3a and 3b contribute only to corresponding ones of the light 2a and the light 2b, respectively, will be described. The wavelength of the light 2a is designated by $\lambda a$, the wavelength of the light 2b is designated by $\lambda b$, the depth of a groove of the diffracting plane 3a (i.e. the depth of a concave portion with respect to a convex portion of concave and convex portions of the diffracting plane 3a) is designated by d1, the depth of a groove of the diffracting plane 3b (i.e. the depth of a concave portion with respect to a convex portion of concave and convex portions of the diffracting plane 3b) is designated by d2, the refraction index of the diffraction element 2 for the light with the wavelength $\lambda a$ is designated by na, and the refraction index of the diffraction element 2 for the light with the wavelength $\lambda b$ is designated by nb.

In order for the diffracting plane 3a to diffract only the light 2a, and not to diffract the light 2b, the depth d1 may be determined in such a manner that the depth corresponds to the phase for transmitting 80% and diffracting 8% of the light with the wavelengths of the light 2a, and the depth corresponds to the phase for transmitting 100% of the light with the wavelengths of the light 2b (obtained by multiplying the wavelength λb by even number). When the phase for transmitting 80% and diffracting 8% of the light is designated by L, and the ratio of the circumference of a circle to its diameter is designated by π, the above-mentioned conditions can be expressed by the following equations:

$$(na-1)\cdot d1\cdot 2\pi/\lambda a = L + 2\pi\cdot ma \text{ (ma is an integer equal to or more than 0)}$$

$$(nb-1)\cdot d1\cdot 2\pi/\lambda b = 2\pi\cdot ka \text{ (ka is an integer equal to or more than 0)}$$

In the case where λa is 660 nm, λb is 780 nm, na is 1.51, nb is 1.5 (the refraction index of glass), and L is 0.927 rad (the phase by which the zero-order diffraction efficiency is 80%), ma is 1 and ka is 1 when d1 is 1560 nm, thereby satisfying the above-mentioned conditions. Thus, the diffracting plane 3a contributes only to the light 2a.

Similarly, the conditions where the diffracting plane 3b contributes only to the light 2b can be expressed by the following equations:

$$(nb-1)\cdot d2\cdot 2\pi/\lambda b = L + 2\pi\cdot mb \text{ (mb is an integer equal to or more than 0)}$$

$$(na-1)\cdot d2\cdot 2\pi/\lambda a = 2\pi\cdot kb \text{ (kb is an integer equal to or more than 0)}$$

When d2 is 7920, mb is 5 and kb is 6, so that the above-mentioned conditions are satisfied. Thus, the diffracting plane 3b contributes only to the light 2b.

As shown in FIG. 4A, lattice patterns of the diffracting planes 3a and 3b are mutually shifted corresponding to the deviation between the center C1 of the light 2a and the center C2 of the light 2b. The center C3 of the center region 162 of the diffracting plane 3a is the center between the dividing lines L1 and L2, and the center of the width W in the direction of the lattice groove. The center C4 of the center region 162 of the diffracting plane 3b is the center between the dividing lines L1 and L2, and the center of the width W in the direction of the lattice groove. The center of the center region 162 is also referred t as a pattern center. As shown in FIG. 4B, the lattice patterns of the diffracting planes 3a and 3b are mutually shifted in such a manner that the pattern center C3 of the diffracting plane 3a is matched with the center C1 of the light 2a, and the pattern center C4 of the diffracting plane 3b is matched with the center C2 of the light 2b, so that stable tracking control can be performed by either one of the light 2a or 2b.

The width W of the center region 162 of the diffracting plane 3a and the width W of the center region 162 of the diffracting plane 3b may be the same, or may be different from each other.

With the use of the above-described diffracting element 2, the center of light emitted from any one of light emitting elements can be matched with the pattern center. In addition, each of the diffracting planes contributes only to the corresponding one of light, so that any stray light cannot be caused. Therefore, high-precision tracking error signals can be obtained for light of all wavelengths, and it is possible to perform stable tracking control and recording/reproducing operations.

It is desired that the pattern center of the respective diffracting plane is substantially completely matched with the center of the corresponding light, but the invention is not limited to the condition. It is sufficient that, in such a range that high-precision tracking error signals can be obtained, a distance between the center of the light 2a and the pattern center of the diffracting plane 3a is shorter than a distance between the center of the light 2b and the pattern center of the diffracting plane 3a, and a distance between the center of the light 2b and the pattern center of the diffracting plane 3b is shorter than a distance between the center of the light 2a and the pattern center of the diffracting plane 3b. These conditions are also applied to the relationship between a diffracting plane and light in an optical head device with a light source including three light emitting elements which will be described later.

It is desired that each of the diffracting planes diffracts only one corresponding light, but the invention is not limited to this condition. In such a range that stray light can be suppressed in an allowable range, it is sufficient that the diffracting ratio of the light 2a by the diffracting plane 3a is higher than the diffracting ratio of the light 2a by the diffracting plane 3b, and the diffracting ratio of the light 2b by the diffracting plane 3b is higher than the diffracting ratio of the light 2b by the diffracting plane 3a. This is applied to a relationship between a diffracting plane and light in an optical head device with a light source including three light emitting elements which will be described later.

As the diffraction element 2, an optical element of glass which is etched by a desired depth is used. Alternatively, an optical element in which concave and convex portions formed in glass is filled with a resin may be used. FIG. 5 is a cross-sectional view showing a diffraction element 2 in which such concave and convex portions are filled with a resin. As shown in FIG. 5, one of the surfaces of a glass 51 functions as a first diffracting plane 3a and the other functions as a second diffracting plane 3b. The first diffracting plane 3a is filled with a first resin layer 52, and the second diffracting plane 3b is filled with a second resin layer 53.

A material of the first resin layer 52 and the second resin layer 53 is a UV resin, for example. The refraction index thereof varies depending on the amount of additives. The refraction index of the glass 51 with respect to the light having wavelength λa is designated by nga, the refraction index of the glass 51 with respect to the light having wavelength λb is designated by ngb, the refraction index of the first resin layer 52 with respect to the light having wavelength λa is designated by nja, the refraction index of the first resin layer 52 with respect to the light having wavelength λb is designated by njb, the refraction index of the second resin layer 53 with respect to the light having wavelength λa is designated by njja, the refraction index of the second resin layer 53 with respect to the light having wavelength λb is designated by njjb, the etching depth of the first diffracting plane 3a is designated by d3, and the etching depth of the second diffracting plane 3b is designated by d4. At this time, a phase Isa for the light having wavelength λa and a phase Isb for the light having wavelength λb on the first diffracting plane 3a, and a phase Issa for the light having wavelength λa and a phase Issb for the light having wavelength λb on the second diffracting plane 3b are expressed by the following equations:

$$Isa = (nga - nja)\cdot d3\cdot 2\pi/\lambda a$$

$$Isb = (ngb - njb)\cdot d3\cdot 2\pi/\lambda b$$

$$Issa = (nga - njja)\cdot d4\cdot 2\pi/\lambda a$$

$$Issb = (ngb - njjb)\cdot d4\cdot 2\pi/\lambda b$$

When the refraction indexes of the first and second resin layers 52 and 53 are adjusted so that ngb=njb, and nga=njja, Isb=0, and Issa=0. Specifically, the first diffracting plane 3a does not contribute to the light having wavelength λb, but contributes only to the light having wavelength λa. Similarly, the second diffracting plane 3b does not contribute to the light having wavelength λa, but contributes only to the light having wavelength λb.

If the depths d3 and d4 are determined so that the phases Isa and Issb are the phases by which the zero-order diffraction efficiency is 80%, and the lattice patterns of the respective diffracting planes 3a and 3b are the patterns corresponding to the deviations of positions of the light emitting elements 1a and 1b, a diffraction element 2 having the same characteristics as the above-described ones can be obtained. As described above, it is unnecessary for each diffracting plane to satisfy the conditions for light of two kinds of wavelengths, so that the phase can be reduced. Thus, the generation of higher-order diffraction can be suppressed, and higher diffraction efficiency can be realized.

As shown in FIG. 6, second and third glasses 61 and 62 are disposed on the first and second resin layers 52 and 53. With this configuration, the resin layers are not directly in contact with the air, so that the reliability and the durability of the diffraction element can be improved.

In this embodiment, the characteristics of the polarizing beam splitter 3 are varied depending on the wavelengths. Alternatively, the characteristics may be the same for different wavelengths.

In this embodiment, a quarter-wave plate is used as an n/4 wave plate 5. Alternatively, any n/4 wave plate can be used if n is an odd number.

In this embodiment, a single lens is used as the objective lens 6. Alternatively, the objective lens 6 may be a combination lens with high NA.

The optical head device 100 of this embodiment is an optical head device of infinite system. Alternatively, the optical head device 100 may be an optical head device of finite system without employing any collimator lens.

The optical head device 100 of this embodiment is an optical head device of polarizing optical system. Alternatively, the optical head device 100 may be an optical head device of non-polarizing optical system.

In this embodiment, the light directly travels to the objective lens. Alternatively, an optical system in which a light path is turned by using a mirror, thereby reducing the thickness of the optical head device may be used.

In this embodiment, the diffraction element 2 is disposed between the light source 1 and the polarizing beam splitter 3. With such a configuration, the light passes through the diffraction element 2 in the outgoing route but does not pass therethrough in the returning route. Thus, the light in the returning route is not affected by the diffraction. Since there is no loss in the reflected light from the optical recording medium 7 or stray light is not caused, so that high-precision tracking error signals can be obtained.

If a polarizing hologram having polarizing properties is used as the diffraction element 2, and the polarizing properties are switched between the outgoing route and the returning route, the diffraction element 2 can be disposed between the polarizing beam splitter 3 and the objective lens 6. In such a case, the light spot on the diffraction element 2 can be enlarged, so that the influence by the deviation between the light beam and the diffraction element 2 can be reduced.

In this embodiment, the pattern of the diffraction element 2 is divided into three portions. Alternatively, the pattern may be divided into two or more portions. In the case where the pattern is divided into two portions, the pattern center is positioned on a dividing line. In the case where the pattern is divided into four portions, the pattern center is positioned on a dividing line which is the middle one of three dividing lines.

Figure 7A:
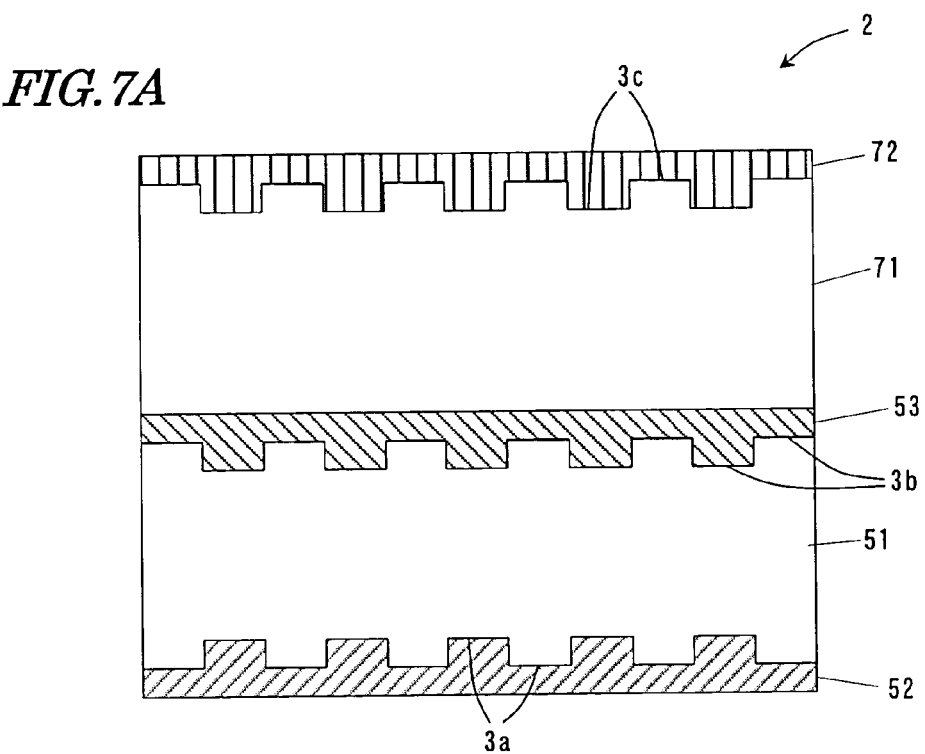
FIG. 7A is a cross-sectional view showing a diffraction element in one embodiment of the invention.

This embodiment employs a light source in which two light emitting elements having mutually different wavelengths are mounted in one module. Alternatively, a light source in which three light emitting elements having mutually different wavelengths are mounted in one module may be used. The light emitted from the three light emitting elements are, for example, light with wavelengths of 390 nm to 420 nm, light with wavelengths of 640 nm to 680 nm, and light with wavelengths of 760 nm to 800 nm. In this case, a diffraction element 2 shown in FIG. 7A is used. The diffraction element 2 includes, in addition to the first glass 51, the first resin layer 52, and the second resin layer 53, a second glass 71 disposed on the second resin layer 53, and a third resin layer 72 with which a diffracting plane 3c of the second glass 71 is filled. The diffraction element 2 includes three diffracting planes corresponding to the three light emitting elements. By disposing the three diffracting planes so that pattern centers of the respective diffracting planes are matched with the centers of the corresponding light, respectively, high-precision tracking error signals can be obtained by any one of the three kinds of light. An optical head device 100 provided with such a diffraction element 2 will be described below.

Embodiment 2

Figure 7B:
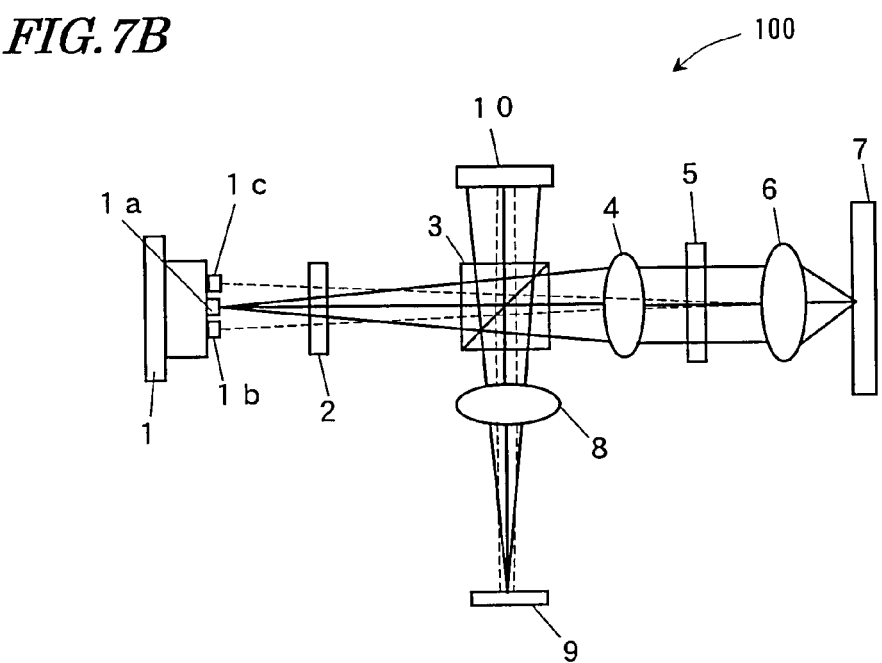
FIG. 7B is a diagram showing an optical head device in one embodiment of the invention.

In an optical head device 100 of this embodiment, a light source 1 is a three-wavelength light source in which, in addition to light emitting elements 1a and 1b, a light emitting element 1c is mounted, as shown in FIG. 7B. The light emitting element 1c emits coherent light with wavelengths of 390 nm to 430 nm, for example. The light emitting elements 1a to 1c are disposed along a direction corresponding to a radial direction of an optical recording medium 7.

For the light with wavelengths of 390 nm to 430 nm, a polarizing beam splitter 3 transmits 90% and reflects 10% of certain linearly polarized light. The polarizing beam splitter 3 reflects 100% of linearly polarized light which is diagonal to the polarizing direction of the certain linearly polarized light. On a surface of an objective lens 6, a diffraction grating is formed so that the numerical aperture (NA) for the light with wavelengths of 390 nm to 430 nm is 0.85.

Next, a diffraction element 2 in this embodiment will be described. In the light source 1, three light emitting elements 1a to 1c are mounted so as to be mutually separated. As a result, the centers of light emitted from the respective light emitting elements 1a, 1b, and 1c are mutually deviated on the diffraction element 2.

The diffraction element 2 of this embodiment includes, as shown in FIG. 7A, a diffracting plane 3a corresponding to the light from the light emitting element 1a, a diffracting plane 3b corresponding to the light from the light emitting element 1b, and a diffracting plane 3c corresponding to the light from the light emitting element 1c. The diffracting plane 3a contributes only to the light from the light emitting element 1a, the diffracting plane 3b contributes only to the light from the light emitting element 1b, and the diffracting plane 3c contributes only to the light from the light emitting element 1c.

Similarly to the lattice pattern described with reference to FIGS. 4A and 4B, lattice patterns of the diffracting planes 3a to 3c are disposed in a deviated manner from each other so as to correspond to the deviation of the centers of the light. The pattern center of the diffracting plane 3a is disposed so as to be matched with the center of the light from the light emitting element 1a, the pattern center of the diffracting plane 3b is disposed so as to be matched with the center of the light from the light emitting element 1*b*, and the pattern center of the diffracting plane 3*c* is disposed so as to be matched with the center of the light from the light emitting element 1*c*. Since the lattice patterns of the diffracting planes 3*a* to 3*c* are disposed in such a deviated manner from each other, stable tracking control can be performed by using light from any one of the light emitting elements 1*a* to 1*c*.

By employing the above-described diffraction element 2, all of the centers of light emitted from the light emitting elements can be matched with the corresponding pattern centers, respectively. In addition, each of the diffracting planes contributes only to the corresponding one kind of light, so that any stray light does not occur. Accordingly, high-precision tracking error signals can be obtained for light of all wavelengths, and it is possible to perform stable tracking control and recording/reproducing operations.

Next, the operation of the optical head device 100 of this embodiment will be described.

The recording and/or reproducing operation to and/or from a DVD by using light with wavelengths of 640 nm to 680 nm and the recording and/or reproducing operation to and/or from a CD by using light with wavelengths of 760 nm to 800 nm are the same as those in the optical head device 100 in Embodiment 1, so that the descriptions thereof are omitted.

The recording and/or reproducing operation to and/or from an optical recording medium 7 in the case where the optical recording medium 7 is a BD (Blu-ray disc) or an HD-DVD (High Definition DVD) corresponding to the light with wavelengths of 390 nm to 430 nm will be described.

The light (wavelengths of 390 nm to 430 nm) emitted from the light emitting element 1*c* of the light source 1 is diffracted into three light beams (a zero-order diffracted light beam, and ±1st-order diffracted light beams) by the diffraction element 2. The polarizing beam splitter 3 transmits 90% and reflects 10% of the diffracted light. The light transmitted through the polarizing beam splitter 3 is converted into parallel light by a collimator lens 4. The parallel light is converted from linearly polarized light into circularly polarized light by a quarter-wave plate 5. The circularly polarized light is focused on a recording plane of the optical recording medium 7. The three light beams formed by the diffraction element 2 are respectively and independently focused on the recording plane of the optical recording medium 7 by an objective lens 6, thereby forming three focused light spots. As shown in FIG. 15, the three focused light spots 149*a* to 149*c* are formed in a substantially straight line so as to be simultaneously incident on one and the same guide groove of guide grooves which are formed at regular intervals on the optical recording medium 7.

The circularly polarized light reflected from the recording plane of the optical recording medium 7 is transmitted through the objective lens 6, and then converted from the circularly polarized light into linearly polarized light by the quarter-wave plate 5. The linearly polarized light is polarized in a direction orthogonal to the direction of the linearly polarized light emitted from the light emitting element 1*c*. The linearly polarized light is transmitted through the collimator lens 4, and 100% of the light is reflected by the polarizing beam splitter 3. The reflected light is transmitted through a detection lens 8 for applying astigmatism. Then, the light is incident on a photo detector 9. The photo detector 9 performs photoelectric transfer in accordance with the incident light, so as to produce electric signals for obtaining information signals and servo signals (a focus error signal for focus control, and a tracking error signal for tracking control).

The 10% of the light emitted from the light emitting element 1*c* and reflected by the polarizing beam splitter 3 is received by a photo detector 10. Based on an electric signal output from the photo detector 10, the emitting power of the light emitting element 1*c* is controlled.

The diffraction element 2 of this embodiment includes three diffracting planes for corresponding light emitting elements. In some cases, due to a production error of the diffraction element, a certain diffracting plane may disadvantageously have a characteristic for diffracting light with a wavelength not corresponding to the diffracting plane. As the number of diffracting planes increases, the disadvantageous influence also increases. Therefore, in order to reduce the number of diffracting planes as small as possible, a diffraction element may include only two diffracting planes. In such a diffraction element, one diffracting plane may correspond to one light emitting element, and the other diffracting plane may correspond to one of the remaining light emitting elements having shorter wavelengths. In such a case, the diffraction element cannot completely correspond to the light emitting element with longer wavelengths. However, an optical recording medium which utilizes light of longer wavelengths has wide margin for tracking. For this reason, even though there occurs some influence on tracking, a diffraction element having the above-mentioned configuration can be realized for the purposes of reducing the number of diffracting planes.

In this embodiment, three light emitting elements are mounted on one light source. Alternatively, an optical head device may include one light source having two light emitting elements (for emitting light with wavelengths of 640 nm to 680 nm and for emitting light with wavelengths of 760 nm to 800 nm, for example), and one light source having one light emitting element (for emitting light with wavelengths of 390 nm to 430 nm, for example), and the diffraction element 2 may be disposed in a light path after the respective light is combined. Alternatively, before the respective light from the light source having two light emitting elements and from the light source having one light emitting element is combined, the light from the light source having two light emitting elements may be transmitted through the diffraction element 2 corresponding to the two light emitting elements.

Embodiment 3

Figure 8:
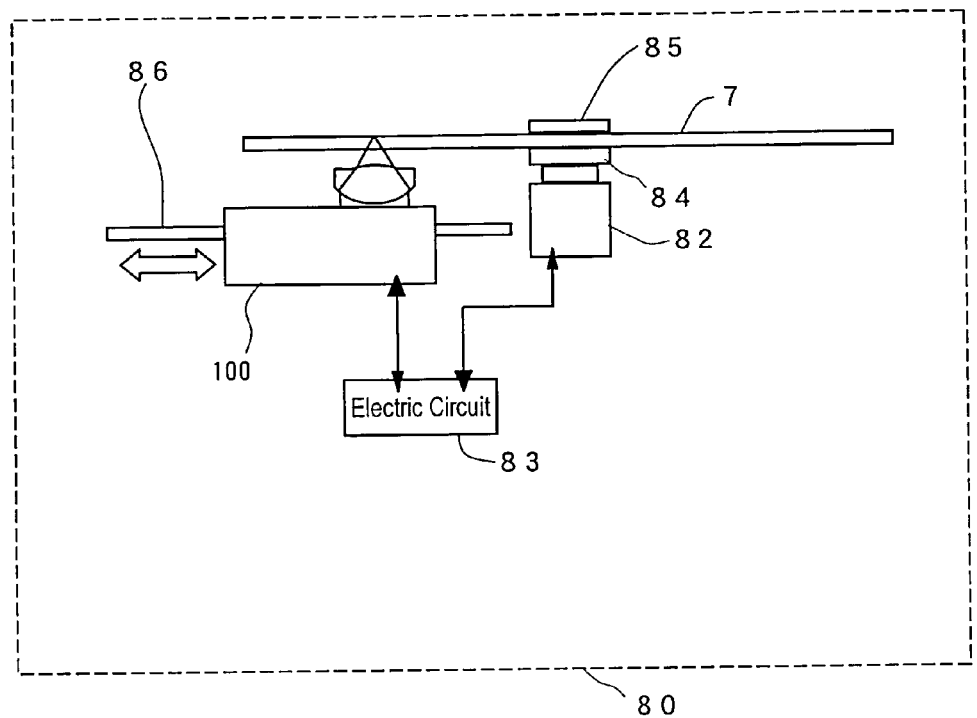
FIG. 8 is a diagram showing an optical information apparatus in one embodiment of the invention.

FIG. 8 is a diagram showing an optical information apparatus 80 in Embodiment 3 according to the invention. The optical information apparatus 80 performs recording and/or reproducing of information to and/or from an optical recording medium 7.

The optical information apparatus 80 includes an optical head device 100, a motor 82, an electric circuit 83, a turning table 84, a cramping circuit 85, and a driving unit 86 for the optical head device. The optical head device 100 is the same as the optical head device 100 described in Embodiments 1 and 2. The electric circuit 83 functions as a control unit for controlling operations of the optical head device 100 and the other components.

The optical recording medium 7 is put on the turning table 84, and turned by the motor 82. The optical head device 100 is moved to a track position of the optical recording medium 7 in which desired information is recorded by means of the driving unit 86.

The optical head device 100 transmits a focus error signal or a tracking error signal to the electric circuit 83 in accordance with the positional relationship with the optical recording medium 7. In response to the signals, the electric circuit 83 transmits a signal for finely adjusting the objective lens to the optical head device 100. In response to the signal, the optical head device 100 performs the focus control and tracking control for the optical recording medium 7, thereby performing the reading, writing, or deleting of information.

The optical information apparatus 80 is provided with the above-described optical head device 100, so that stable recording/reproducing operation can be performed for a plurality of types of optical recording mediums by the signal optical head device.

Embodiment 4

Figure 9:
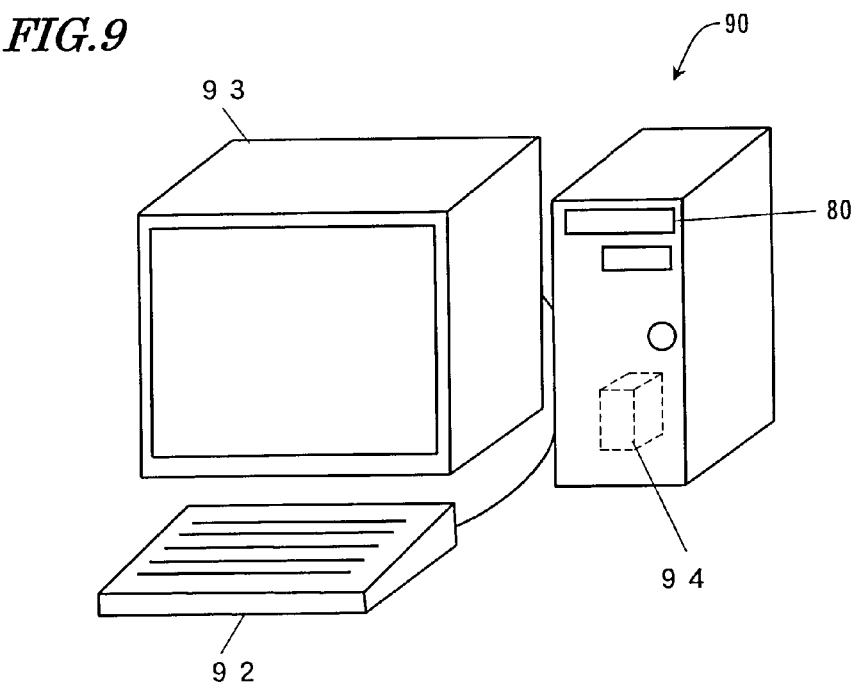
FIG. 9 is a diagram showing a computer in one embodiment of the invention.

FIG. 9 is a diagram showing a computer 90 in Embodiment 4 according to the invention. The computer 90 is provided with the optical information apparatus (an optical disk drive) 80 shown in FIG. 8.

The computer 90 includes the optical disk drive 80, a keyboard 92 as an input device for inputting information, a monitor 93 as an output device for displaying information, and a processing device 94. The processing device 94 is a central processing unit (CPU) for performing the processing based on the information input through the keyboard 92 or the information read out of the optical disk drive 80. The input device may be a mouse, a touch panel, or the like, and the output device may be a printer or the like.

The computer 90 provided with the optical disk drive 80 as a storage device stably records or reproduces information to or from a plurality of types of optical disks, such as a BD, an HD-DVD, a DVD, a CD, and the like, and can be utilized in various applications. The optical disk 7 mounted on the optical disk drive 80 can back up the hard disk drive in the computer by taking advantages of the large capacity of the optical disk 7. By taking advantages of the cheep and portable characteristics of the optical disk, and the compatibility by which information in the optical disk can be read out by another optical disk drive, programs and data can be exchanged with other persons, or can be carried around for own use.

Embodiment 5

Figure 10:
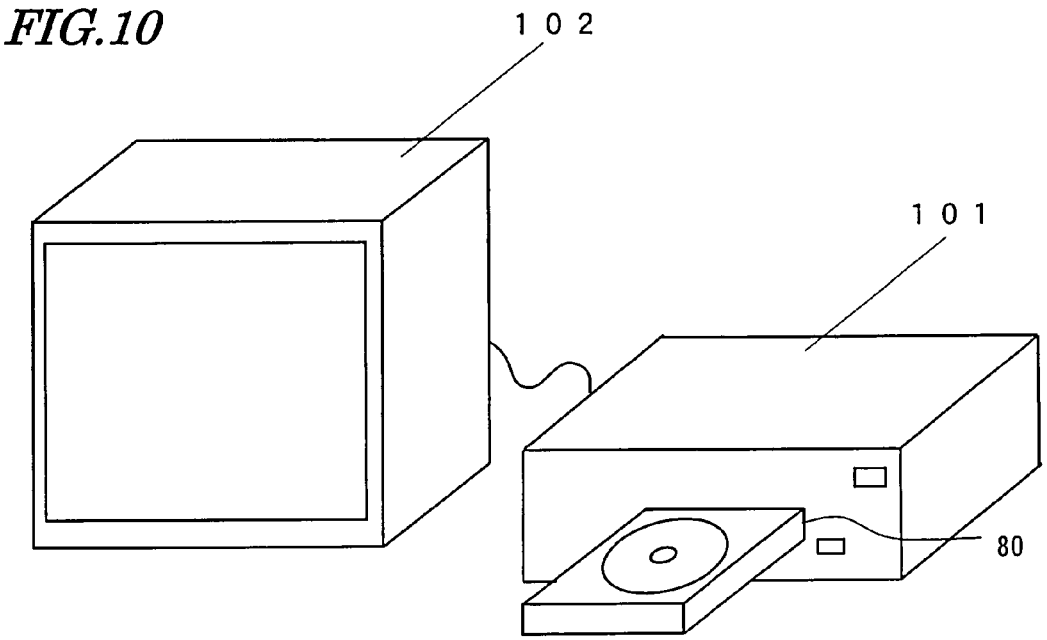
FIG. 10 is a diagram showing a video recording/reproducing apparatus in one embodiment of the invention.

FIG. 10 is a diagram showing an optical disk recorder (a video recording/reproducing apparatus) 101 in Embodiment 5 according to the invention.

The optical disk recorder 101 is provided with the optical information apparatus (the optical disk drive) 80 shown in FIG. 8. The optical disk recorder 101 is used by being connected to a monitor 102 for displaying video information recorded on an optical disc.

The optical disk recorder 101 provided with the optical disk drive 80 can stably record or reproduce video information to or from a plurality of types of optical disks such as a BD, an HD-DVD, a DVD, and a CD, thereby being utilized in various applications. The optical disk recorder 101 records video information on a medium (an optical disk), and a user can reproduce the video information when the user wants to reproduce the video information. As for the optical disk, unlike videotape, it is unnecessary to rewind the tape after the recording or the reproducing. In addition, it is possible to perform a time shift playback for performing reproduction from the beginning of a program while the program is being recorded, or simultaneous recording and reproduction for reproducing a program which was previously recorded while another program is being recorded. By taking advantages of the cheep and portable characteristics of the optical disk, and the compatibility by which information on the optical disk can be read out by another optical disk recorder, the recorded video information can be exchanged with another person, or can be carried around for own use.

The optical disk recorder 101 may include a hard disk drive in addition to the optical disk drive 80. Alternatively, the optical disk recorder 101 may have a recording/reproducing function of videotape. In such a case, operations for video information such as copy, move, backup and the like can be easily performed.

Embodiment 6

Figure 11:
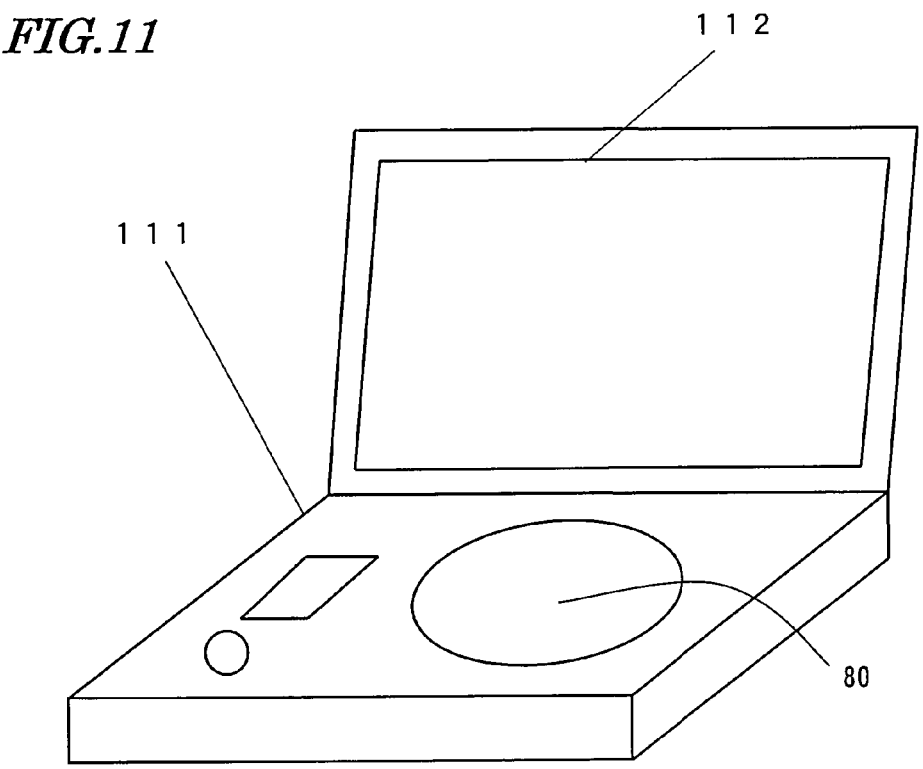
FIG. 11 is a diagram showing a video reproducing apparatus in one embodiment of the invention.

FIG. 11 is a diagram showing an optical disk player (a video reproducing apparatus) 111 in Embodiment 6 according to the invention. The optical disk player 111 includes the optical disk drive (the optical information apparatus) 80 shown in FIG. 8, and a liquid crystal monitor 112.

The optical disk player 111 displays video information recorded on an optical disk on the liquid crystal monitor 112. The optical disk player 111 provided with the optical disk drive 80 can stably reproduce video information from a plurality of types of optical disks such as a BD, an HD-DVD, a DVD, a CD, and the like, so that the optical disk player 111 can be used in various applications.

A user can reproduce video information recorded on an optical disk when the user wants to reproduce the video information by using the optical disk player 111. As for the optical disk, unlike videotape, it is unnecessary to rewind the tape after the reproduction. In addition, the reproduction can be performed by accessing to an arbitrary position on an optical disk in which certain video information is recorded.

Embodiment 7

Figure 12:
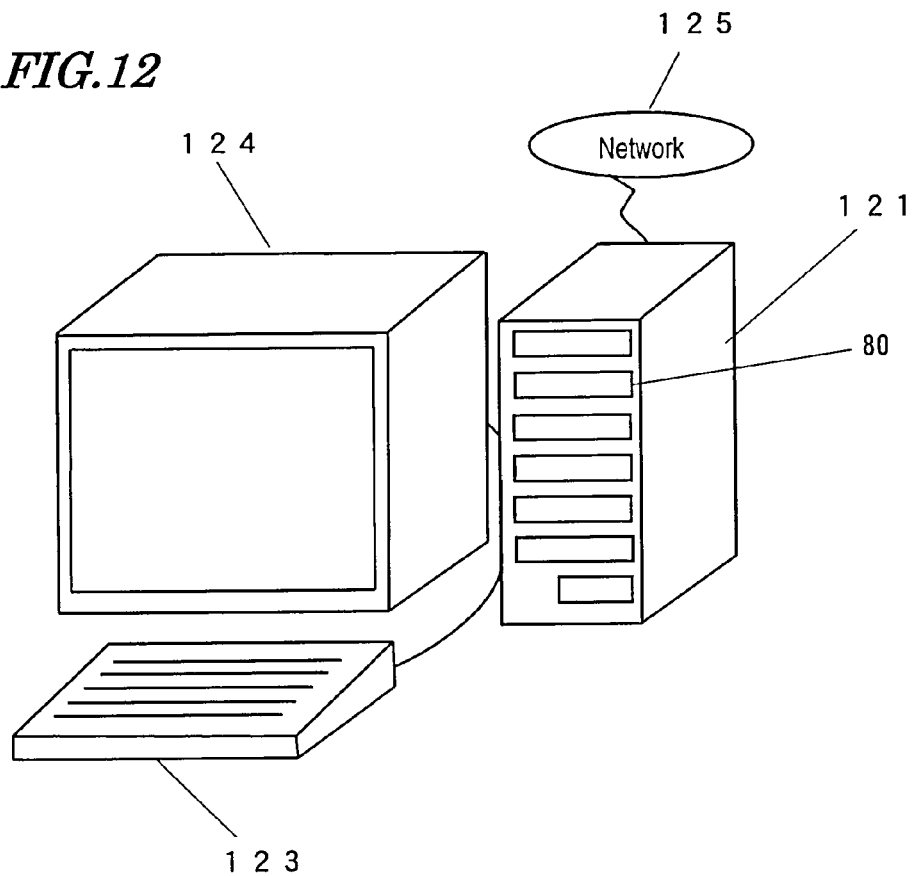
FIG. 12 is a diagram showing a server in one embodiment of the invention.

FIG. 12 is a diagram showing a server 121 in Embodiment 7 according to the invention. The server 121 is provided with the optical information apparatus (the optical disk drive) 80 shown in FIG. 8.

The server 121 is connected to a monitor 124 for displaying information and a keyboard 123 for inputting information, and also connected to network 125.

The server 121 provided with the optical disk drive 80 can stably record or reproduce information to or from a plurality of types of optical disks such as a BD, an HD-DVD, a DVD, a CD, and the like, so that the server 121 can be used in various applications. By taking advantages of the large capacity of an optical disk, the optical disk drive 80 can perform recording/reproduction of large amount of information. The optical disk drive 80 transmits information (image, voice, video, HTML document, text document, and the like) recorded on the optical disk in response to the requirement by the network 125. Moreover, the optical disk drive 80 records information transmitted from the network 125 into a required position on the optical disk.

Embodiment 8

Figure 13:
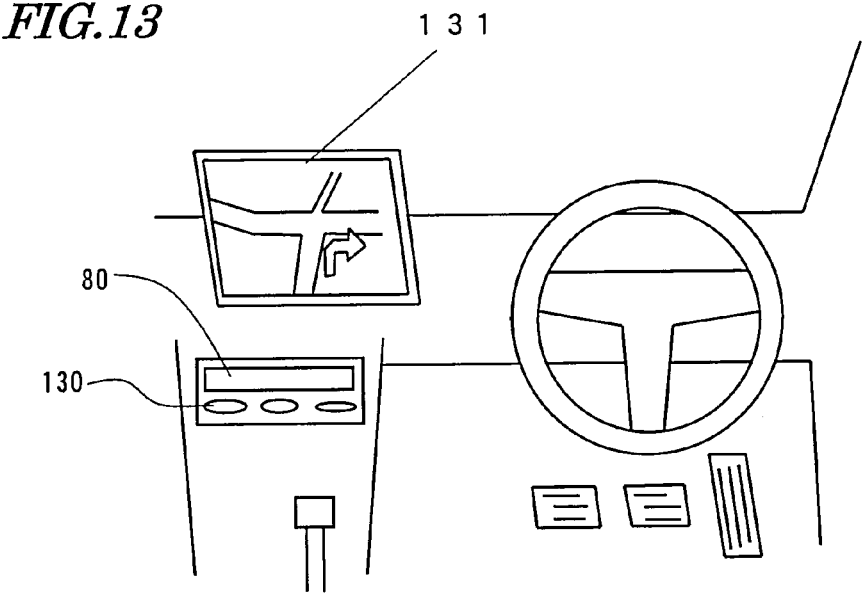
FIG. 13 is a diagram showing a car navigation system in one embodiment of the invention.
Figure 14:
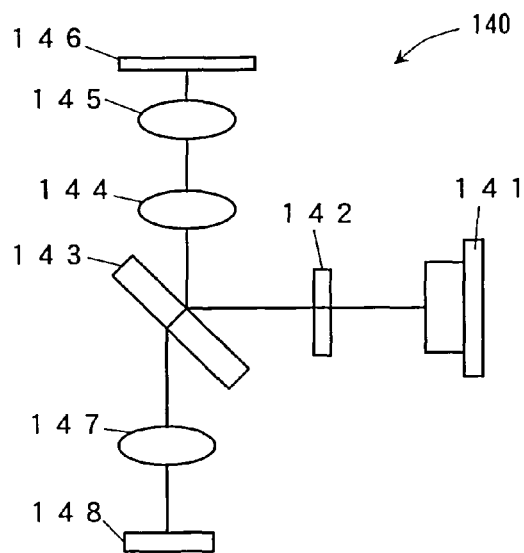
FIG. 14 is a diagram showing an optical head device.

FIG. 13 is a diagram showing a car navigation system 130 in Embodiment 8 according to the invention.

The car navigation system 130 is provided with the optical information apparatus (the optical disk drive) 80 shown in FIG. 8. The car navigation system 130 is connected to a liquid crystal monitor 131 for displaying map or destination information.

The car navigation system 130 provided with the optical disk drive 80 can stably record or reproduce information to or from a plurality of types of optical disks such as a BD, an HD-DVD, a DVD, a CD, and the like, so that the car navigation system 130 can be used in various applications. The car navigation system 130 determines the present position by using the information obtained from global positioning system (GPS), a gyroscope, a speed indication, an odometer, and the like, and by using map information recorded on the optical disk. The determined position is displayed on the liquid crystal monitor 131. When the destination is input, the optimal route to the destination is determined based on the map information and traffic information, and the optimal route is displayed on the liquid crystal monitor 131.

An optical disk with large capacity is used for recording map information, so that a wide area can be covered by a single disk, and also detailed traffic information can be provided by the single disk. In addition, information such as restaurants, convenience stores, gas stations, and the like near the road can be also stored in the optical disk, so that such information can be provided. Moreover, the road information becomes old as the time passes by, and the road information does not agree with the actual road conditions. However, an optical disk is compatible and the medium is cheep, so that the disk is exchanged to a disc storing new road information, thereby obtaining the latest information. The car navigation system 130 can reproduce from and/or record to a BD, an HD-DVD, a DVD, a CD, and the like, so that it is possible to see a movie or listen to music in an automobile.

The embodiments of the invention are described above, but the invention is not limited to the above-described embodiments. The invention can be applied to other embodiments based on the technical ideas of the invention.

In the above-described embodiments, an apparatus for recording information onto an optical recording medium with light is described. However, the invention may be applied to an apparatus for recording information onto a magnetic optical recording medium with both light and magnetism. In such a case, the same effects as those described above can be attained.

In the above-described embodiments, the optical recording medium is an optical disk. The optical recording medium may be a card-type optical recording medium, and the like. The invention can be applied to an apparatus of a type in which information can be recorded/reproduced with light.

The invention is particularly useful in a technical field in which information is recorded/reproduced with light.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

This application is based on Japanese Patent Applications No. 2006-274913 filed on Oct. 6, 2006 and No. 2007-258509 filed on Oct. 2, 2007, the entire contents of which are hereby incorporated by reference.

What is claimed is:

1. An optical head device for performing at least one of recording and reproducing of information for a plurality of types of optical recording mediums, comprising:
    a light source for emitting light;
    an objective lens for focusing the light onto an optical recording medium; and
    a diffraction element disposed between the light source and the objective lens, the diffraction element having a plurality of diffracting planes, wherein
    the light source emits a plurality of kinds of light having mutually different wavelengths,
    positions for emitting the plurality of kinds of light from the light source are mutually deviated,
    the plurality of kinds of light includes first light and second light,
    the plurality of diffracting planes includes first and second diffracting planes,
    a distance between a center of the first light and a pattern center of the first diffracting plane is shorter than a distance between a center of the second light and the pattern center of the first diffracting plane,
    a distance between the center of the second light and a pattern center of the second diffracting plane is shorter than a distance between the center of the first light and the pattern center of the second diffracting plane,
    a ratio of diffraction for diffracting the first light by the first diffracting plane is higher than a ratio of diffraction for diffracting the first light by the second diffracting plane, and
    a ratio of diffraction for diffracting the second light by the second diffracting plane is higher than a ratio of diffraction for diffracting the second light by the first diffracting plane.

2. The optical head device of claim 1, wherein the pattern center of the first diffracting plane and the pattern center of the second diffracting plane are mutually deviated.

3. The optical head device of claim 1, wherein
    a material of at least part of the diffraction element is glass,
    the first diffracting plane includes a first concave and convex portion on a first surface of the glass,
    the second diffracting plane includes a second concave and convex portion on a second surface opposite to the first surface of the glass, and
    depths of concaves with respect to convexes in the first concave and convex portion and in the second concave and convex portion are mutually different.

4. The optical head device of claim 3, wherein the diffraction element further includes:
    a first resin layer with which the first concave and convex portion is filled; and
    a second resin layer with which the second concave and convex portion is filled.

5. The optical head device of claim 4, wherein glass is disposed on the first and second resin layers.

6. The optical head device of claim 1, wherein the number of kinds of light emitted from the light source is the same as the number of the plurality of diffracting planes.

7. The optical head device of claim 1, wherein the center of the first light is matched with the pattern center of the first diffracting plane, and
    the center of the second light is matched with the pattern center of the second diffracting plane.

8. The optical head device of claim 1, wherein the light source includes a first light emitting element for emitting the first light, and a second light emitting element for emitting the second light, and
    the first and second light emitting elements emit the first light and the second light in the same direction.

9. The optical head device of claim 1, further comprising a separating portion, disposed between the light source and the objective lens, for separating the light emitted from the light source from reflected light from the optical recording medium, wherein
    the diffraction element is disposed between the light source and the separating portion.

10. The optical head device of claim 1, wherein the first light and the second light are one of light with wavelengths of 390 nm to 420 nm, light with wavelengths of 640 nm to 680 nm, and light with wavelengths of 760 nm to 800 nm, respectively, and the wavelengths of the first light and the second light are mutually different.

11. The optical head device of claim 1, wherein
the plurality of kinds of light includes third light,
the plurality of diffracting planes include a third diffracting plane,
a distance between the center of the first light and the pattern center of the first diffracting plane is shorter than distances between the centers of the second light and the third light and the pattern center of the first diffracting plane,
a distance between the center of the second light and the pattern center of the second diffracting plane is shorter than distances between the centers of the first light and the third light and the pattern center of the second diffracting plane, and
a distance between the center of the third light and a pattern center of the third diffracting plane is shorter than distances between the centers of the first light and the second light and the pattern center of the third diffracting plane.

12. An optical information apparatus comprising:
the optical head device of claim 1; and
a control portion for controlling the operation of the optical head device.

13. A computer comprising the optical information apparatus of claim 12.

14. A video recording/reproducing apparatus comprising the optical information apparatus of claim 12, for performing recording and reproducing of video information to and from the optical recording medium.

15. A video reproducing apparatus comprising the optical information apparatus of claim 12, for reproducing video information from the optical recording medium.

16. A server comprising the optical information apparatus of claim 12.

17. A car navigation system comprising the optical information apparatus of claim 12.

* * * * *